United States Patent
Silverman et al.

(10) Patent No.: US 10,492,470 B1
(45) Date of Patent: Dec. 3, 2019

(54) PET DETERRENT SYSTEM

(71) Applicants: Joesph Silverman, New Milford, NJ (US); Mark Einhorn, New Milford, NJ (US)

(72) Inventors: Joesph Silverman, New Milford, NJ (US); Mark Einhorn, New Milford, NJ (US)

( * ) Notice: Subject to any disclaimer, the term of this patent is extended or adjusted under 35 U.S.C. 154(b) by 338 days.

(21) Appl. No.: 15/484,219

(22) Filed: Apr. 11, 2017

(51) Int. Cl.
*A01K 15/02* (2006.01)
*A01K 11/00* (2006.01)
*A01K 27/00* (2006.01)

(52) U.S. Cl.
CPC .......... *A01K 15/021* (2013.01); *A01K 11/006* (2013.01); *A01K 27/001* (2013.01); *A01K 27/009* (2013.01)

(58) Field of Classification Search
CPC ..... A01K 15/021; A01K 15/02; A01K 27/009
See application file for complete search history.

(56) References Cited

U.S. PATENT DOCUMENTS

| | | | | |
|---|---|---|---|---|
| 4,745,882 A * | 5/1988 | Yarnall, Sr. | ............... | A01K 3/00 119/721 |
| 5,170,149 A * | 12/1992 | Yarnall, Sr. | .......... | A01K 15/023 119/721 |
| 5,207,179 A * | 5/1993 | Arthur | ................. | A01K 15/023 119/721 |
| 5,575,242 A | 11/1996 | Davis | | |
| 5,787,841 A | 8/1998 | Titus | | |
| 6,016,100 A | 1/2000 | Boyd | | |
| 6,079,367 A * | 6/2000 | Stapelfeld | ............ | A01K 15/021 119/719 |
| 7,021,244 B2 | 4/2006 | Boyd | | |
| 7,421,979 B2 * | 9/2008 | Kim | ...................... | A01K 15/023 119/712 |
| 7,518,522 B2 * | 4/2009 | So | ........................ | A01K 15/023 119/720 |
| 9,293,027 B2 | 3/2016 | Wilson | | |
| 2006/0180094 A1 | 8/2006 | Viggiano | | |
| 2012/0132151 A1 * | 5/2012 | Touchton | ............ | A01K 15/021 119/720 |
| 2012/0137987 A1 | 6/2012 | Moulin | | |
| 2013/0092098 A1 * | 4/2013 | Dutcher | ................ | A01K 15/04 119/721 |
| 2014/0144389 A1 | 5/2014 | Richards | | |

FOREIGN PATENT DOCUMENTS

JP          5590687 B2      9/2014

* cited by examiner

*Primary Examiner* — Kristen C Hayes
(74) *Attorney, Agent, or Firm* — Kyle A. Fletcher, Esq.

(57) ABSTRACT

The pet deterrent system is a training device that is adapted for use with an animal. The animal is a domesticated animal that is commonly referred to as a pet. The pet deterrent system: 1) senses when an animal enters a monitored space; and, 2) generates a deterrent response that discourages the animal from entering the space monitored by the pet deterrent system. The pet deterrent system trains the animal to avoid entering the monitored space. The pet deterrent system comprises a tracker and a sensor. The tracker is worn by the animal. The sensor is an active sensor that monitors the monitored space. When the tracker is detected in the monitored space the sensor generates a deterrent response intended to discourage the animal from entering the monitored space.

16 Claims, 5 Drawing Sheets

PET DETERRENT SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of agriculture including animal husbandry, more specifically, a device for taming or training animals.

SUMMARY OF INVENTION

The pet deterrent system is a training device that is adapted for use with an animal. The animal is a domesticated animal that is commonly referred to as a pet. The pet deterrent system: 1) senses when an animal enters a monitored space; and, 2) generates a deterrent response 151 that discourages the animal from entering the space monitored by the pet deterrent system. The pet deterrent system trains the animal to avoid entering the monitored space. The pet deterrent system comprises a tracker and a sensor. The tracker is worn by the animal. The sensor is an active sensor that monitors the monitored space. When the tracker is detected in the monitored space the sensor generates a deterrent response intended to discourage the animal from entering the monitored space.

These together with additional objects, features and advantages of the pet deterrent system will be readily apparent to those of ordinary skill in the art upon reading the following detailed description of the presently preferred, but nonetheless illustrative, embodiments when taken in conjunction with the accompanying drawings.

In this respect, before explaining the current embodiments of the pet deterrent system in detail, it is to be understood that the pet deterrent system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the pet deterrent system. It is therefore important that the claims be regarded as including such equivalent construction insofar as they do not depart from the spirit and scope of the pet deterrent system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
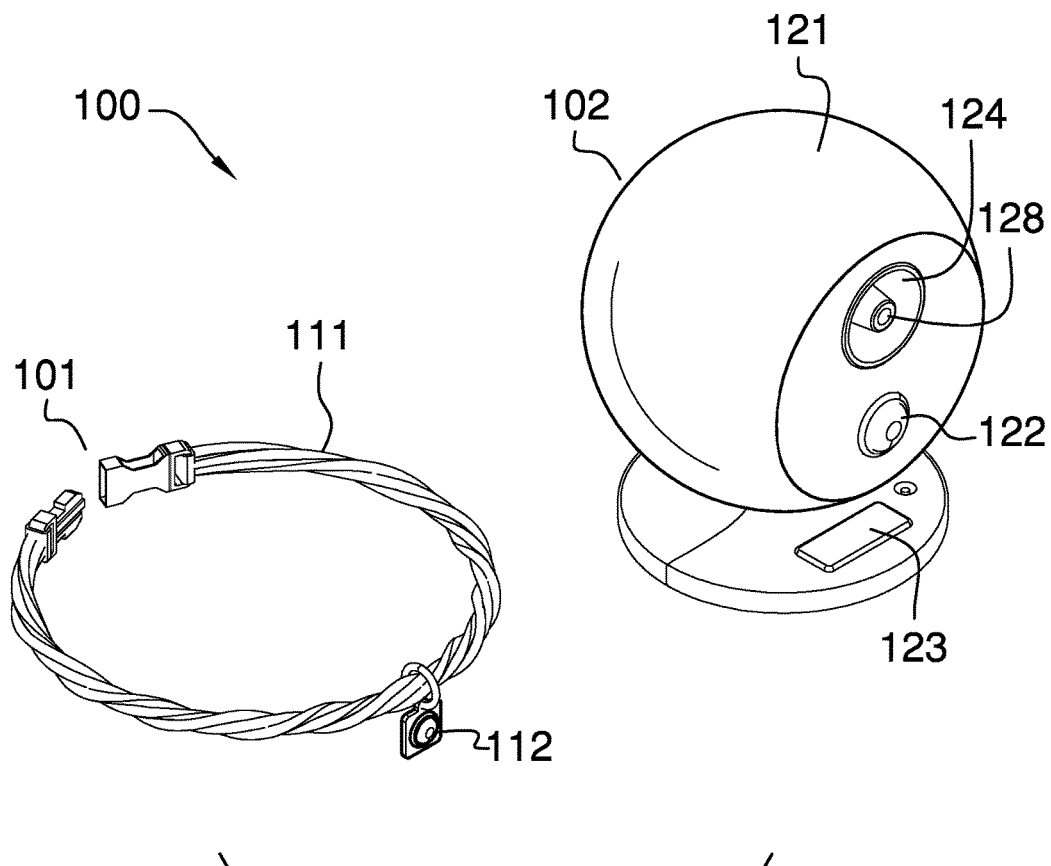
FIG. 1 is a perspective view of an embodiment of the disclosure.
Figure 2:
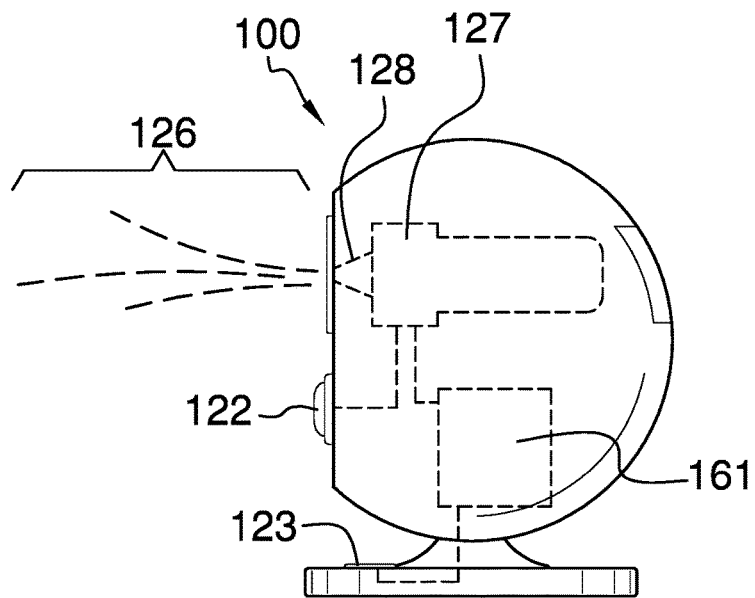
FIG. 2 is a side view of an embodiment of the disclosure.
Figure 3:
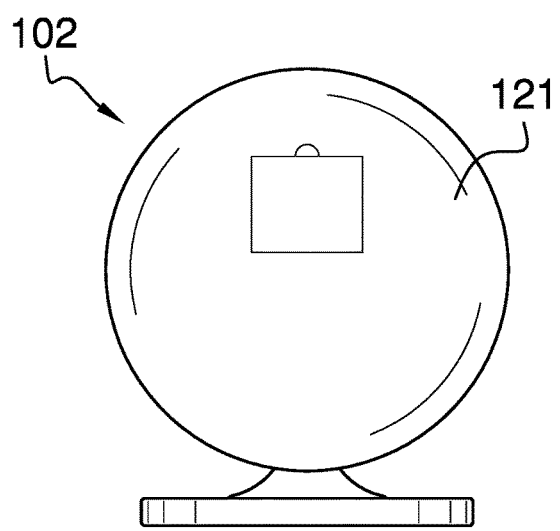
FIG. 3 is a rear view of an embodiment of the disclosure.
Figure 4:
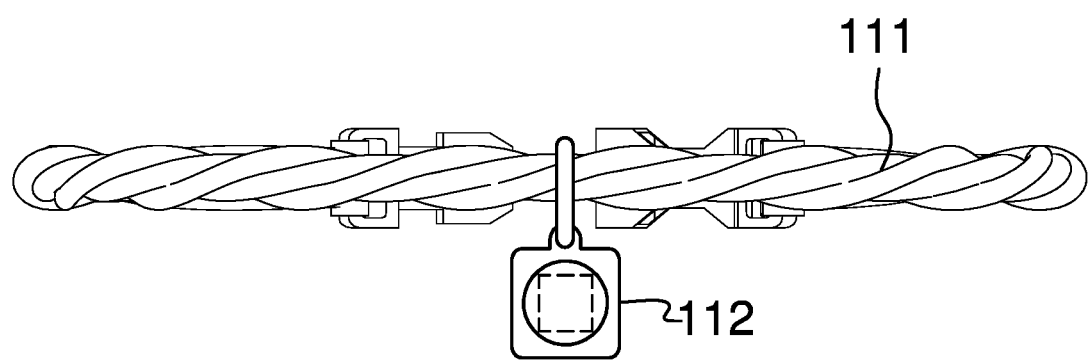
FIG. 4 is a front view of an embodiment of the disclosure.
Figure 5:
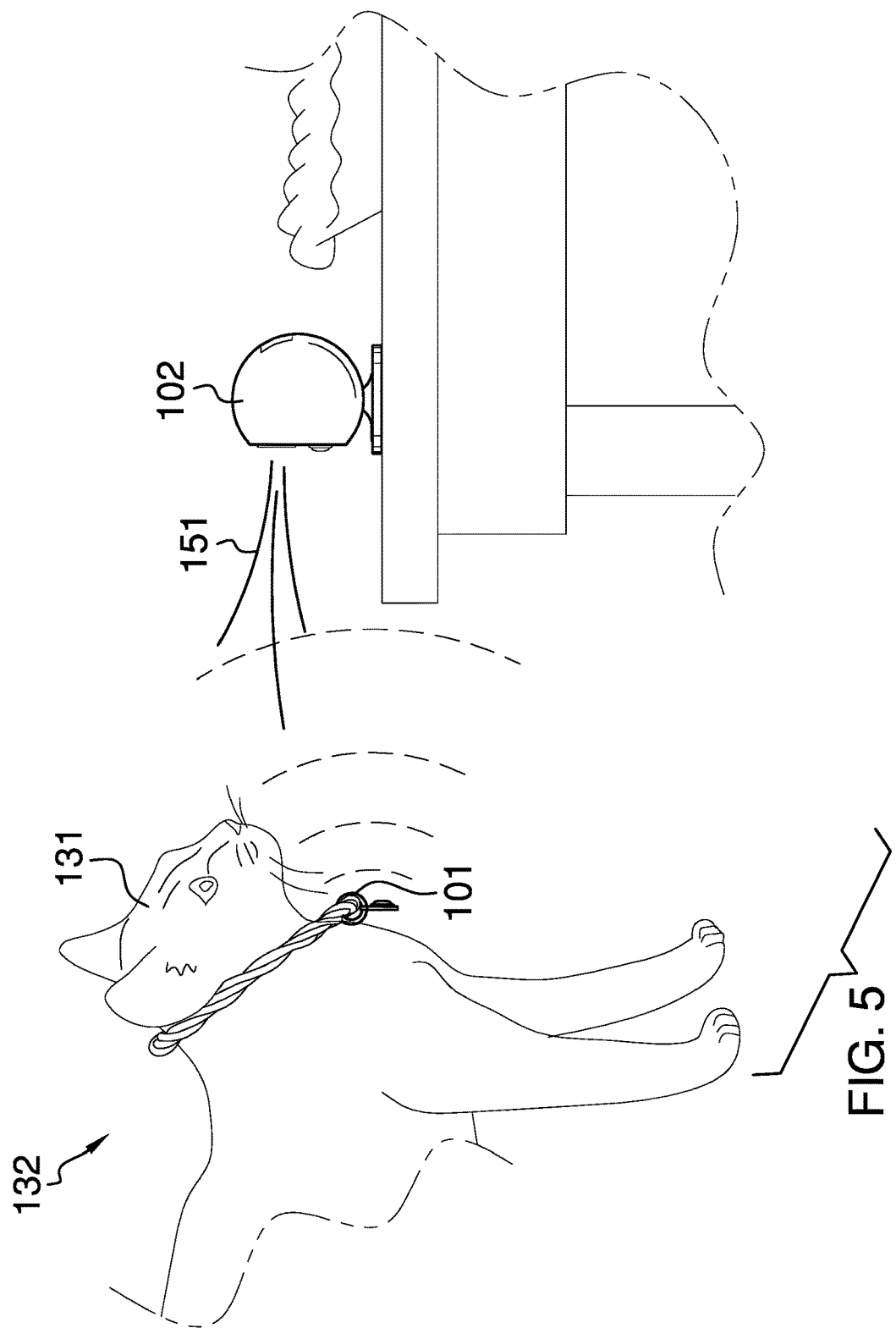
FIG. 5 is an in use view of an embodiment of the disclosure.
Figure 6:
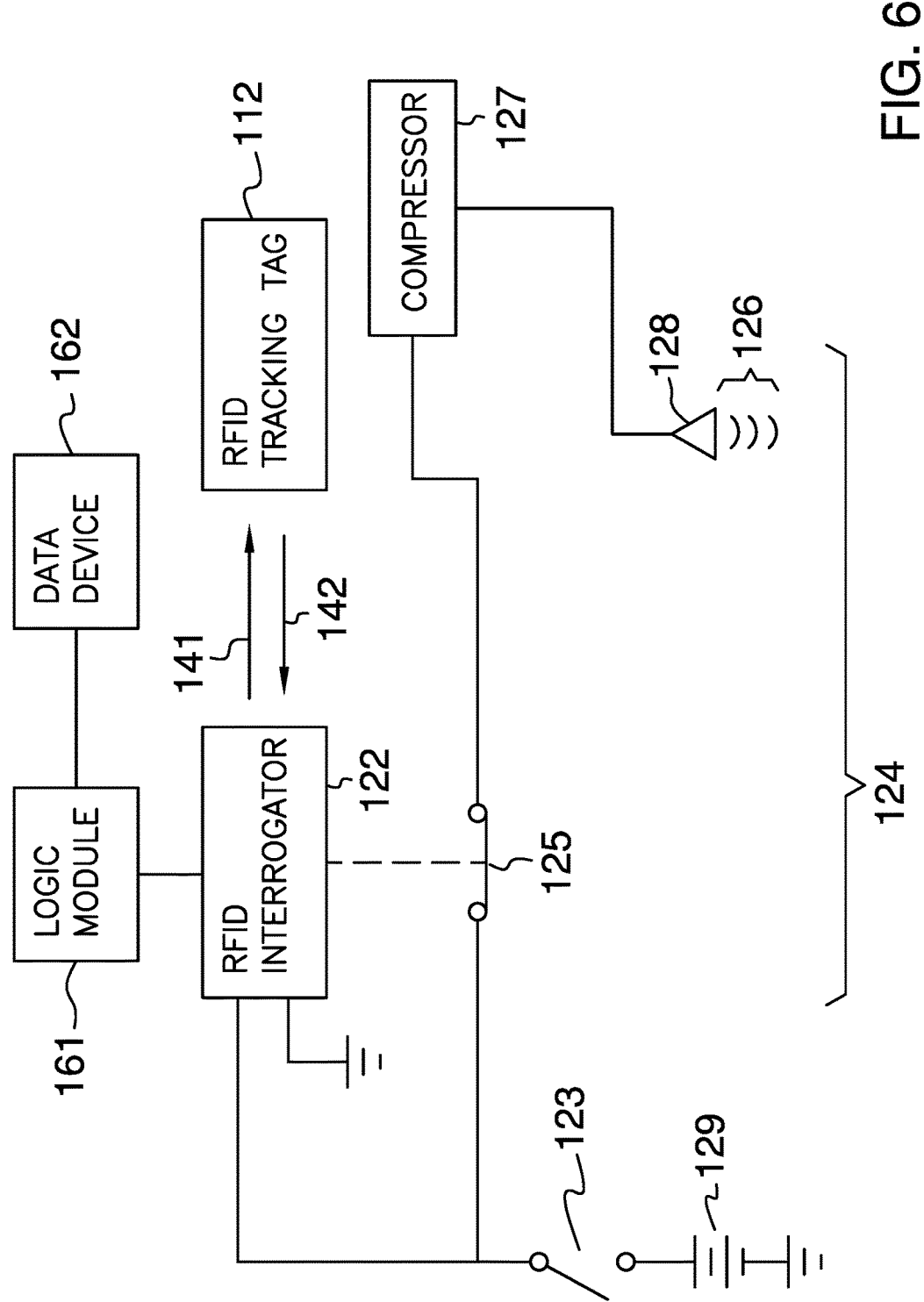
FIG. 6 is a schematic view of an embodiment of the disclosure.

Detailed reference will now be made to one or more potential embodiments of the disclosure, which are illustrated in FIGS. 1 through 6.

The pet deterrent system 100 (hereinafter invention) is a training device that is adapted for use with an animal 131. The animal 131 is a domesticated animal 131 that is commonly referred to as a pet. The invention 100: 1) senses when an animal 131 enters a monitored space 132; and, 2) generates an deterrent response 151 that discourages the animal 131 from entering the space monitored 132 by the invention 100. The monitored space 132 is a designated domestic space within which the presence of the animal 131 is not desired. The invention 100 trains the animal 131 to avoid entering the monitored space 132. The invention 100 comprises a tracker 101 and a sensor 102. The tracker 101 is worn by the animal 131. The sensor 102 is an active sensor 102 that monitors the monitored space 132. When the tracker 101 is detected in the monitored space 132 the sensor 102 generates a deterrent response 151 intended to discourage the animal 131 from entering the monitored space 132. The deterrent response 151 is stream of compressed air that is used to discourage entry into the monitored space 132 by the animal 131.

In the first potential embodiment of the disclosure, the invention 100 comprises an RFID system.

The tracker 101 is a device that is worn by the animal 131 as a collar 111. The tracker 101 responds to an interrogation signal 141 generated by the sensor 102. The tracker 101 comprises a collar 111 and an RFID tracking tag 112.

The collar 111 is a readily and commercially available pet collar. The collar 111 is a device that is traditionally worn around the neck of an animal 131 for identification and animal control purposes. The RFID tracking tag 112 attaches to the collar 111. The RFID tracking tag 112 is a readily and commercially available device that modifies and reflects an interrogation signal 141 in such a manner that the sensor 102 will detect and identify the reflected signal as an interrogation response 142.

The interrogation signal 141 is a radio frequency signal that is transmitted by the RFID interrogator 122 and received by the RFID tracking tag 112. The interrogation response 142 is a radio frequency signal that is transmitted by the RFID tracking tag 112 and received by the RFID interrogator 122. The RFID tracking tag 112 reflects the received interrogation signal 141 to create the interrogation response 142 in much that same manner as a funhouse mirror reflects light.

In the first potential embodiment of the disclosure, the RFID tracking tag 112 is a passive RFID tracking tag 112. A passive RFID tracking tag 112 is preferred because: 1) the limited range of a passive RFID tracking tag 112 is better suited for use in domestic spaces; and, 2) the relatively weak signal strength of a passive RFID tracking tag 112 is less likely to create false positives that might be generated when the RFID tracking tag 112 detects the interrogation signal 141 and reflects the interrogation response 142 from outside the monitored space 132.

The sensor 102 is a device that is placed within the monitored space 132. The sensor 102 continuously generates an interrogation signal 141. In cases wherein the tracker 101 detects the interrogation signal 141 the tracker 101 then responds with an interrogation response 142 which is taken by the sensor 102 to indicate that an animal 131 has entered the monitored space 132. The sensor 102 comprises a housing 121, an RFID interrogator 122, a power switch 123, and an deterrence circuit 124.

The housing 121 is a rigid casing that contains the components of the sensor 102. It is assumed that the housing 121 will contain all ports and apertures necessary for the operation of the invention 100. The housing 121 is placed on a horizontal surface, such as a floor or a table, during use of the invention 100.

The RFID interrogator 122 is a commercially available RFID interrogator 122. The RFID interrogator 122 further incorporates the capability to generate an electrical signal that initiates the deterrent response 151.

The power switch 123 is a readily and commercially available switch. The power switch 123 controls the flow of electricity from an externally provided source of electricity 129 to the electrical components contained within the sensor 102. The power switch 123 is used as an on off switch.

The deterrence circuit 124 is an electric circuit that activates the deterrent response 151 in response to an electric signal generated by the RFID interrogator 122. The deterrence circuit 124 comprises a deterrent switch 125, compressed air 126, a compressor 127, and a nozzle 128.

The deterrent switch 125 is a readily and commercially available relay. The deterrent switch 125 is electrically connected to the RFID interrogator 122 such that the deterrent switch 125 will close in response to the receipt of the electric signal from the RFID interrogator 122.

The compressed air 126 is a readily and commercially available source of a gas or mixture of gases that is generated via the compressor 127. The compressor 127 generates: 1) the compressed air 126; and, 2) supplies the compressed air 126 to the nozzle 128. It shall be noted that the compressor 127 may have an integrated tank that stores the compressed air 126, and that the tank includes a valve to release the compressed air 126 to the nozzle 128 directly. This sort of compressor is well known and is commercially available. The nozzle 128 is a readily and commercially available fitting that releases the compressed air 126 into the atmosphere.

The nozzle 128 is selected such that the nozzle 128 will generate a flow of the compressed air 126. The flow of the compressed air 126 generates the deterrent response 151. It shall be noted that the deterrent response 151 formed via the compressed air 126 is both audible as well as able to be felt.

In a second potential embodiment of the disclosure, the sensor 102 further comprises a logic module 161. The sensor 102 is further configured for use with a data device 162. The data device 162 is a personal electronic device that is provided externally. The data device 162 allows for the customization of the responses of the logic module 161.

The logic module 161 is a readily and commercially available electronic device that interfaces with the RFID interrogator 122. The logic module 161 processes the interrogation response 142 to extract the identification code of the RFID tracking tag 112 in order to identify the animal 131. The logic module 161 thereby allows the sensor 102 to identify the animal 131 entering the monitored space 132.

The use of the logic module 161 allows the sensor 102 to limit the generation of the electric signal by the RFID interrogator 122 to one or more specific animals 131 that may be present in the domestic space. Depending on the design and the selection of the components use in the invention 100 the functions of the logic module 161 may be incorporated directly into the RFID interrogator 122.

The following definitions were used in this disclosure:

Collar: As used in this disclosure, a collar is a ring like device that is placed around an object.

Compressed Air: In this disclosure, compressed air means air that has been compressed to a pressure greater than atmospheric pressure.

Interface: As used in this disclosure, an interface is a physical or virtual boundary that separates two different systems across which information is exchanged.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs.

Nozzle: As used in this disclosure, a nozzle is a device that receives a fluid or gas under pressure and disperses that fluid or gas into the atmosphere as a spray or pattern. Nozzles are often used to create audible sounds.

Relay: As used in this disclosure, a relay is an automatic electromagnetic or electromechanical device that reacts to changes in voltage or current by opening or closing a switch in an electric circuit. Relays further defined with a coil and a switch. Applying a voltage to the coil, usually referred to as energizing the coil, will cause the coil to change the position of the switch. Note: Transistors can be configured to perform switching functions similar to that of a relay and are explicitly included within the intent of this definition. To state the last sentence more directly: within the context of this disclosure a transistor may be used to replace a relay if that is desirable.

RFID: As used in this disclosure, RFID refers to Radio Frequency Identification technology. RFID is a wireless technology that uses electromagnetic field to identify and retrieve data from tracking tags that are placed on an object.

RFID Interrogator: As used in this disclosure, an RFID interrogator is a transceiver that transmits a radio signal at frequency designed to activate RFID tracking tags that are tuned to operate at that frequency. The RFID interrogator further receives and processes the reflected radio signal generated by the RFID tag.

RFID Tracking Tag: As used in this disclosure, an RFID tracking tag is a reflective antenna that receives a radio signal from an RFID Interrogator and uses the energy received from the RFID interrogator signal to reflect a modified signal back to the RFID interrogator. The modified signal generally contains identification information about the RFID tag. The RFID interrogator receives and records these reflected signals. RFID tags are generally tuned to respond to a specific frequency. The RFID tracking tag as described to this point is a passive, or unpowered RFID tracking tag. There are also available within RFID technology active, or powered, RFID tracking tags. An active RFID tracking tag acts as a beacon that actively transmits identification information in a manner that can be received and recorded by an RFID interrogator. Within this disclosure, both passive and active RFID tracking tags are used.

Solenoid: As used in this disclosure, a solenoid is a cylindrical coil of electrical wire that generates a magnetic field that can be used to mechanically move a shaft made of a magnetic core.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Transceiver: As used in this disclosure, a transceiver is a device that is used to transmit and receive radio signals.

Turbulence: As used in this disclosure, turbulence describes the motion or flow of a fluid wherein the velocities and pressures within the fluid flow will vary randomly or in an incalculably complex fashion.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An animal control device comprising:
a tracker and a sensor;
wherein the sensor is an active sensor that monitors a monitored space;
wherein the sensor senses the tracker;
wherein when the tracker is detected in the monitored space the sensor generates a deterrent response;
wherein the animal control device is a training device;
wherein the animal control device is adapted for use with an animal;
wherein the tracker is a device that is adapted to be worn by the animal as a collar;
wherein the deterrent response is audible;
wherein the animal control device comprises an RFID system;
wherein the tracker responds to an interrogation signal generated by the sensor;
wherein the tracker comprises a collar and an RFID tracking tag;
wherein the collar is adapted to be worn around the neck of the animal;
wherein the RFID tracking tag attaches to the collar;
wherein the RFID tracking tag modifies and reflects the interrogation signal such that the sensor will detect and identify the reflected signal as an interrogation response.

2. The animal control device according to claim 1
wherein the interrogation signal is a radio frequency signal that is transmitted by the RFID interrogator and received by the RFID tracking tag;
wherein the interrogation response is a radio frequency signal that is transmitted by the RFID tracking tag and received by the RFID interrogator.

3. The animal control device according to claim 2 wherein the RFID tracking tag is a passive RFID tracking tag.

4. The animal control device according to claim 3 wherein the sensor continuously generates the interrogation signal.

5. The animal control device according to claim 4
wherein the sensor comprises a housing, an RFID interrogator, a power switch, and an deterrence circuit;
wherein the RFID interrogator, the power switch, and the deterrence circuit are contained within the housing.

6. The animal control device according to claim 5
wherein the housing is a rigid casing;
wherein the housing is placed on a horizontal surface within the monitored space;
wherein the power switch is used as an on off switch.

7. The animal control device according to claim 6 wherein the RFID interrogator is a transceiver.

8. The animal control device according to claim 7 wherein the RFID interrogator further comprises the capability to generate an electrical signal.

9. The animal control device according to claim 8
wherein the deterrence circuit is an electric circuit;
wherein the deterrence circuit activates the deterrent response in response to the electric signal generated by the RFID interrogator.

10. The animal control device according to claim 9
wherein the deterrence circuit comprises a deterrent switch, a compressor that generates compressed air, and a nozzle;
wherein the deterrent switch is electrically connected to the RFID interrogator and the compressor;
wherein the compressor generates the compressed air, which is supplied to the nozzle.

11. The animal control device according to claim 10
wherein the deterrent switch is a relay;
wherein the deterrent switch closes in response to the receipt of the electric signal from the RFID interrogator.

12. The animal control device according to claim 11
wherein the nozzle is a fitting that releases the compressed air into the atmosphere;
wherein the nozzle is selected such that the nozzle will generate a flow of the compressed air;
wherein the flow of the compressed air generates the deterrent response.

13. The animal control device according to claim 12
wherein the sensor further comprises a logic module;
  wherein the sensor is further configured for use with a data device;
  wherein the RFID tracking tag further comprises a unique identification code that is incorporated into the interrogation response;
  wherein the data device allows for the customization of the responses of the logic module;
  wherein the logic module is interfaces with the RFID interrogator.

14. The animal control device according to claim 13 wherein the logic module processes the interrogation response to extract the unique identification code of the RFID tracking tag.

15. The animal control device according to claim 14 wherein the logic module limits the response of the deterrence circuit to the receipt of an interrogation response that contains a unique identification code that matches a previously identified unique identification code.

16. The animal control device according to claim 15 wherein the functions of the logic module are incorporated directly into the RFID interrogator.

\* \* \* \* \*